United States Patent Office 2,994,358
Patented Aug. 1, 1961

2,994,358
PNEUMATIC TYRES
Henry William Trevaskis, Blackdown, near Leamington Spa, England, assignor to Dunlop Rubber Company Limited, London County, England, a company of Great Britain
Filed Mar. 3, 1958, Ser. No. 718,708
Claims priority, application Great Britain Mar. 12, 1957
3 Claims. (Cl. 152—362)

This invention relates to pneumatic tyres and to a method of making a pneumatic tyre.

In a conventional tyre the cord fabric reinforcement, in a number of plies, extends down the sidewalls of the tyre, around a circled bead wire reinforcement located in each of the beads and back up into the sidewalls. The angle of wrap of the cord reinforcement around the circumferential cross-section of the bead wire may be of the order of 180°–200° and it has been found that on moulding the tyre the cord reinforcement tends to slip around the bead wires and this produces objectionable characteristics in the finished tyre. This disadvantage is particularly noticeable in the larger sizes of pneumatic tyre.

The object of the present invention is to provide an improved pneumatic tyre, and a method of making a tyre, wherein this disadvantage is largely overcome.

According to the present invention a pneumatic tyre having a wire or textile cord fabric reinforcement comprises an annular bead wire located in each of the beads of the tyre and around which the ends of said reinforcement are turned, and an additional wire circlet of larger diameter than said bead wire located radially-outwardly of said bead wire, said circlet serving to wrap and lock said reinforcement securely around the major portion of the cross-sectional periphery of said head wire.

The bead wire may be of any conventional type. For example, it may take the form of a cable comprising a plurality of wires. The wire circlet may comprise a single wire filament, or a strand or a cable. It is preferably of smaller cross-sectional area than the bead wire and has an inner diameter slightly larger than the outside diameter of the bead wire so that, when fitted over the bead wire, it forces the free end of the tyre cord reinforcement around the major portion of the circumferential cross-section of the bead wire and up against the portion of the reinforcement extending through the side wall of the tyre from the crown thereof.

According to the invention also, a method of making a pneumatic tyre having a wire or textile cord fabric reinforcement comprises the steps of turning the free ends of said reinforcement around an annular bead wire and fitting an additional wire circlet radially-outwardly of each bead wire and axially-outwardly of the turned ends of said reinforcement to wrap and lock the reinforcement securely around the major portion of the circumferential cross-section of said bead wire.

Figure 1:
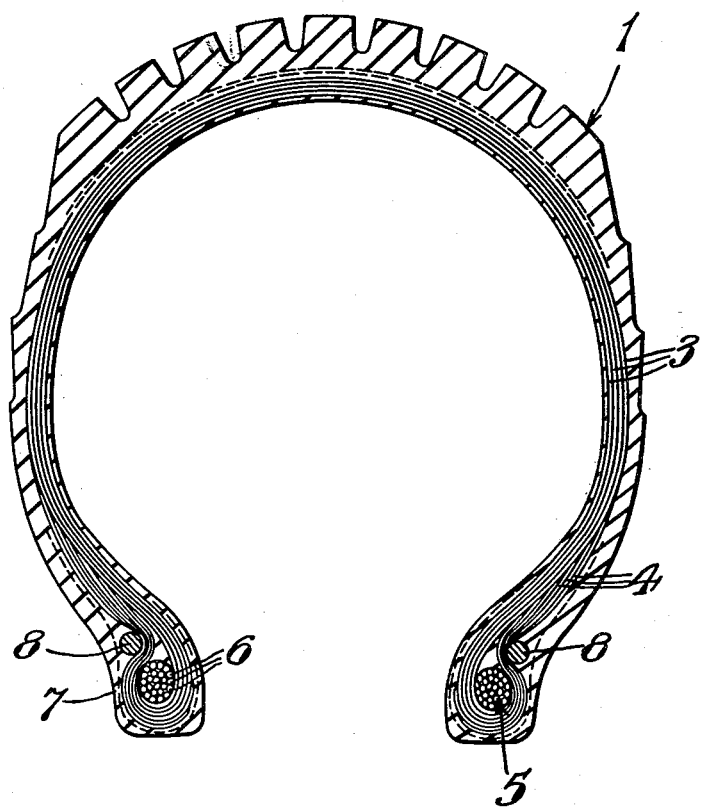
Figure 2:
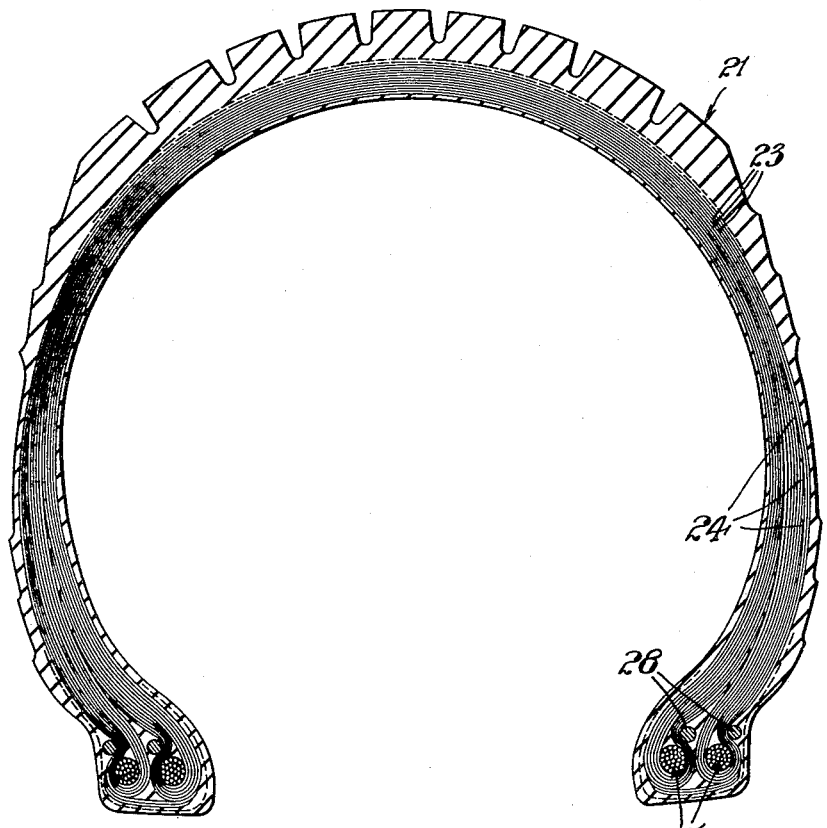
Figure 3:
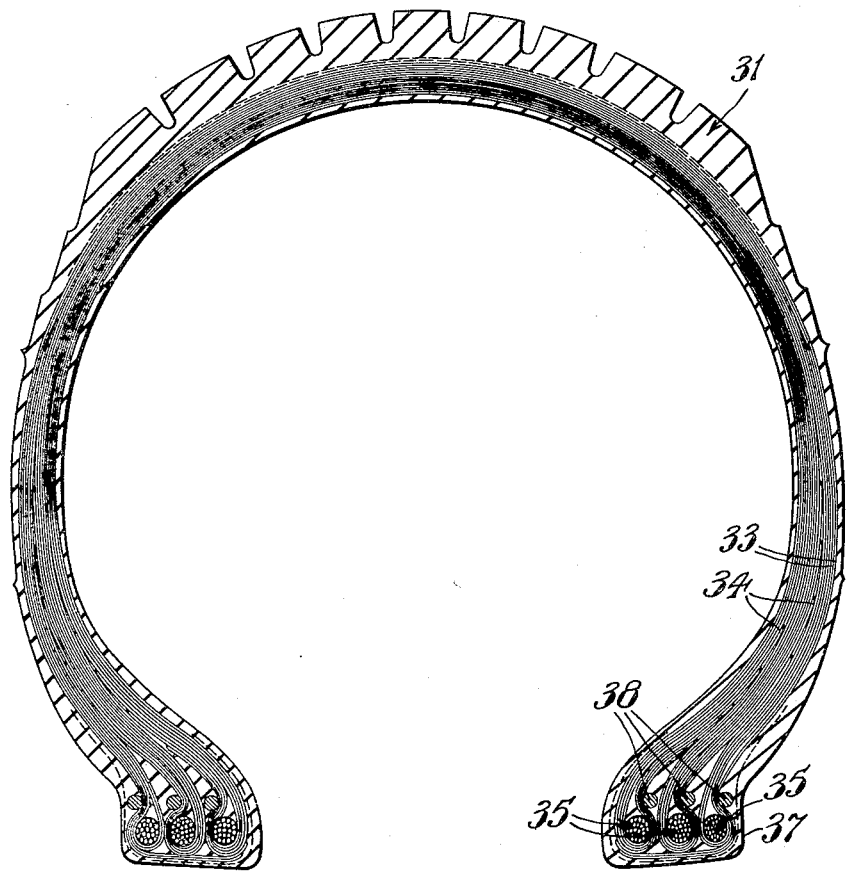

But a better understanding of the invention may be had from the following description when this is read with reference to the accompanying drawings of which FIGURES 1 to 3, respectively, are similar cross-sections through progressively-larger sizes of tyres comprising, respectively, one, two and three separate bead wires and wire circlets.

As shown in FIGURE 1, a pneumatic tyre 1 comprises a rubber body having as an internal reinforcement a number of plies 3 of which the ends 4 are turned around an annulus 5 comprising a plurality of twisted bead wires 6 which are embedded in the bead region 7 of the tyre 1. Also embedded in each bead region 7 is a wire circlet 8 which is of slightly larger diameter than the associated bead wire annulus 5 and is fitted radially-outwardly of said annulus 5 to lock the ends 4 of said plies 3 in a position in which they almost entirely encircle the bead wire annulus 5, or at least cover the major portion of the cirferential cross-sectional thereof.

The embodiments of the tyre shown in FIGURES 2 and 3 are substantially the same as that shown in FIGURE 1 except that the tyre shown therein is of larger cross-sectional size and thus requires a greater number of fabric plies and a stronger bead construction.

As shown in FIGURE 2, the tyre 21 comprises a plurality of plies 23 substantially half of the ends 24 of which are turned outwardly around each of a pair of bead wires 25, and are locked so that they closely surround the greater portion of the cross-sectional peripheries of the bead wires 25 by a pair of wire circlets 28 which are identical with the wire circlets 8 of FIGURE 1.

In FIGURE 3, a still larger tyre 31 is shown as having three bead wires 35 and three circlets 38 in its bead area 37. The fabric reinforcement of the tyre 31 is formed in the same manner as the embodiments of FIGURES 1 and 2 and comprises a plurality of plies 33 a proportion of the ends 34 of which are wrapped around each of the respective bead wires 35 and locked in place by the associated circlets 38.

Each of the tyres 1, 21 and 31 is made up in the usual way, i.e. the fabric plies are fitted to a building drum and the edges are turned down around the sides of the drum. Conventional bead wires 5, 25 or 35 are fitted and the edges 4, 24 or 34 of the plies 3, 23 or 33 are turned up around the bead wires. Where more than one bead wire 5, 25 or 35 is used the wire circlets 8, 28 and 38 are progressively applied to the adjacent bead wires and consolidated to hold the edges of the plies firmly around the bead wires. The tyre is then finished off in the normal manner.

It has been found that with a tyre constructed in this manner the possibility of slippage between the edges of the plies and the bead wire is considerably reduced, since the wrap angle of the plies around the bead wire is substantially increased and the wire circlet additionally tends to lock the ends of the plies in position and prevent slippage during moulding.

Having now described my invention, what I claim is:

1. A pneumatic tyre carcass of elastomeric material comprising a tread portion, a pair of side walls and a pair of beads at the inner periphery of said side walls, at least one pair of bead wires one bead wire of said pair in each bead, a number of reinforcing wires each having two free ends embedded in said carcass and extending from one of the bead wires in one bead to the bead wire in the other bead, the free end portions of said reinforcing wires being returned about said bead wires and into parallelism with the portion thereof extending between said bead wires and terminating in the part of the side walls of said carcass adjacent said bead wires, and a pair of annular retaining elements of larger diameter than that of said bead wires and each positioned on the outer side of said returned portion of its respective bead and pressing said returned portion of said reinforcing wire onto said bead wire and the free ends into parallelism with the portion of the reinforcement extending between said bead wires.

2. A pneumatic tyre of elastomeric material having a tread portion, a pair of side walls and a pair of beads, one at the inner periphery of each side wall and comprising a reinforcement consisting of a number of plies of inextensible reinforcement elements extending across the tyre having free ends terminating in opposite sidewall regions of the tyre, and a number of annular bead wires located in each of the beads of the tyre, and an additional wire circlet of larger diameter than that of said bead wires associated with each of the latter and located radially outwards and axially outwards therefrom and concentric with said bead wires therewith, the free ends of the plies being turned around a corresponding bead wire and passed between said bead wire and the associated circlet, to lock each free end of each ply securely outwardly of the plies around the major portion of the cross-sectional periphery of the corresponding bead wire and adjacent the plies of the side wall region of the tyre.

3. A pneumatic tyre comprising a pair of beads, one at each side of the tyre, at least one bead wire in each of said beads, plies of reinforcing cords extending from one bead to the other and having two free ends each extending within the periphery of the adjacent bead wire and thence radially outwardly into the side wall of the tyre and a wire circlet for each bead wire of larger diameter than its bead wire and located against and in contact with the portion of said reinforcement cords extending outwardly into the side wall to engage and hold said cords against the bead wire.

References Cited in the file of this patent

UNITED STATES PATENTS

| | | |
|---|---|---|
| 1,309,308 | Swinehart | July 8, 1919 |
| 1,341,663 | Neal | June 1, 1920 |
| 2,537,632 | Mansfield et al. | Jan. 9, 1951 |

FOREIGN PATENTS

| | | |
|---|---|---|
| 398,982 | France | Apr. 8, 1909 |